United States Patent [19]

Lopez et al.

[11] 4,357,456

[45] Nov. 2, 1982

[54] LOW VISCOSITY VINYL ESTER RESINS

[75] Inventors: John A. Lopez; Christopher W. Uzelmeier, both of Houston, Tex.

[73] Assignee: Shell Oil Company, Houston, Tex.

[21] Appl. No.: 297,293

[22] Filed: Aug. 28, 1981

[51] Int. Cl.³ .......................................... C08G 59/16
[52] U.S. Cl. ............................. 528/111.5; 528/111.3; 528/112; 528/115
[58] Field of Search .................... 528/112, 115, 111.3, 528/111.5

[56] References Cited

U.S. PATENT DOCUMENTS

| 2,633,458 | 3/1953 | Shokal | 528/112 |
| 2,658,885 | 11/1953 | D'Alelio | 528/112 |
| 3,328,483 | 6/1967 | Enthoven et al. | 528/115 |
| 3,336,241 | 8/1967 | Shokal | 528/112 |
| 3,377,406 | 4/1968 | Newey et al. | 528/112 |
| 3,420,914 | 1/1969 | May | 528/112 |
| 3,658,738 | 4/1972 | van Westrenen | 528/111.5 |
| 3,706,684 | 12/1972 | Lopez | 528/112 |
| 4,017,432 | 4/1977 | Carey | 528/112 |
| 4,247,659 | 1/1981 | Sekmakas et al. | 528/115 |

FOREIGN PATENT DOCUMENTS 1090669  11/1967  United Kingdom ................ 528/112

Primary Examiner—Ronald W. Griffin
Attorney, Agent, or Firm—Norris E. Faringer

[57] ABSTRACT

Vinyl esters exhibiting reduced viscosity are prepared by esterifying at least 90% of the pendant hydroxyl groups of a vinyl ester prepared by reacting an epoxy resin with an ethylenically unsaturated carboxylic acid with a fatty acid or rosin acid.

10 Claims, No Drawings

LOW VISCOSITY VINYL ESTER RESINS

FIELD OF THE INVENTION

The present invention is directed to low viscosity vinyl ester resin compositions derived from epoxy compounds.

BACKGROUND OF THE INVENTION

The preparation of vinyl ester resins by reacting a polyepoxide with an ethylenically unsaturated monocarboxylic acid is well-known. See, for example, U.S. Pat. No. 3,377,406 and 3,420,914. The viscosity of these vinyl esters is too high for many applications, particularly where the coating is subsequently cured by ultraviolet light radiation. Typical viscosities range from about 1,000 to 8,000 poise and higher. In some instances, it is necessary to add lower viscosity reactive diluents; however, many of these reactive diluents are too volatile and/or toxic. Therefore, there is a distinct need to drastically reduce the need for such reactive diluents.

SUMMARY OF THE INVENTION

The present invention is directed to a reduced viscosity vinyl ester resin prepared by first reacting an epoxy compound containing at least one vicinal epoxy group per molecule with an ethylenically unsaturated carboxylic acid, especially a monocarboxylic acid, preferably in the presence of an esterification catalyst and then reacting (esterifying) at least 90%, preferably at least 95% of the pendant hydroxyl groups of vinyl ester with a fatty acid or rosin acid (tall oil), preferably in the presence of an esterification catalyst such as p-toluenesulfonic acid.

DESCRIPTION OF THE PREFERRED EMBODIMENTS

The present invention is particularly directed to reducing the viscosity of epoxy-vinyl esters prepared by reacting an epoxy compound with an ethylenically unsaturated monocarboxylic acid in the presence of an esterification catalyst. The improvement of reduced viscosity is achieved by reacting (esterifying) at least 90% and preferably at least 95% of the hydroxyl groups of the epoxy-vinyl ester with a vegetable oil fatty acid, e.g., linseed oil fatty acids, or rosin acids such as tall oil acids.

The preparation of vinyl esters suitable for use in the present compositions are well-known. See, for example, U.S. Pat. No. 3,377,406 and 3,420, 914.

Briefly, the unsaturated vinyl esters are obtained by reacting polyepoxides having more than one vicinal epoxy group per molecule with ethylenically unsaturated organic acids, especially ethylenically unsaturated monocarboxylic acids.

Polyepoxides

The polyepoxides used to prepare the vinyl ester resins comprise those compounds containing at least one vicinal epoxy group; i.e., at least one

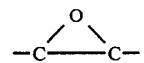

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. No. 3,377,406 and U.S. Pat. No. 3,420,914 and so much of the disclosure relevant to examples of epoxy compounds is incorporated by reference into this specification.

Other examples of suitable polyepoxides include the glycidyl ethers of novolac resins, i.e., phenol-aldehyde condensates. Preferred resins of this type are those of the formula:

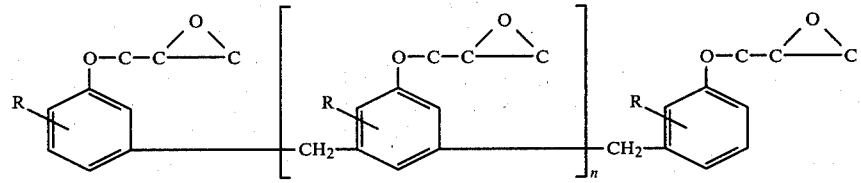

wherein R is hydrogen or an alkyl radical and n is an integer of 1 to about 10. Preparation of these polyepoxides is illustrated in U.S. Pat. No. 2,658,885.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids. i.e., boron trihalides and complexes thereof, and subsquent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol "A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

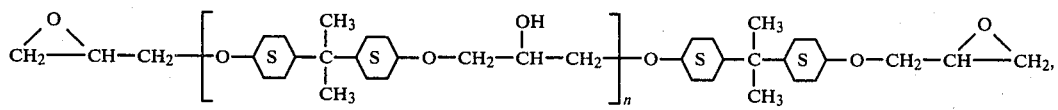

wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Unsaturated Carboxylic Acids

The other component in the reaction comprises an organic carboxylic acid which may be saturated, unsaturated, aliphatic, cycloaliphatic or aromatic, and may be monocarboxylic or polycarboxylic. The preferred acids to be employed are the monocarboxylic acids, such as acetic acid, propionic acid, benzoic acid, toluic acid, cyclohexanecarboxylic acid methylcyclohexanecarboxylic acid, cyclopentanecarboxylic acid, acrylic acid, methacrylic acid, stearic acid, lauric acid, dodecanoic acid, chloracetic acid, phenoxyacetic acid and the like.

Particularly preferred acids to be utilized comprise the ethylenically unsaturated acids such as, for example, acrylic acid, methacrylic acid, crotonic acid, alpha-phenylacrylic acid, alpha-cyclohexylacrylic acid, maleic acid, alpha-chloromaleic acid, tetrahydrophthalic acid, itaconic acid fumaric acid, cyanocrylic acid, methoxyacrylic acid, and the like.

Also particularly preferred are the partial esters of polycarboxylic acids, and particularly the alkyl, alkenyl, cycloalkyl and cycloalkenyl esters of polycarboxylic acids such as, for example, allyl hydrogen maleate, butyl hydrogen maleate, allyl hydrogen phthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

Coming under special consideration, particularly because of the superior coating properties of the resulting unsaturated polyesters, are the ethylenically unsaturated monocarboxylic acids and unsaturated partial esters, and especially the unsaturated aliphatic monocarboxylic acids containing 3 to 10 carbon atoms, and the alkenyl and alkenyl esters of alkenedioic acids containing up to 12 carbon atoms.

Esterification Catalysts

The reaction of the polyepoxides with the unsaturated carboxylic acids to produce the vinyl esters is preferably carried out in the presence of an esterification catalyst such as tertiary amine, phosphine, phosphinic acid, sulfonic acid, or onium compound.

The preferred catalyst comprises the onium salts, and preferably those containing phosphorous, sulfur or nitrogen, such as, for example, the phosphonium, sulfonium and ammonium salts of inorganic acids. Examples of these include, among others, benzyltrimethylammonium sulfate, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenyl methylphosphonium iodide, diethyldibutylphosphonium nitrate, trimethylsulfonium thiocyanate, triphenylsulfonium chloride, dicyclohexyldiamylphosphonium iodide, benzyltrimethylammonium thiocyanate, and the like, and mixtures thereof.

Preferred onium salts to be employed include those of the formula:

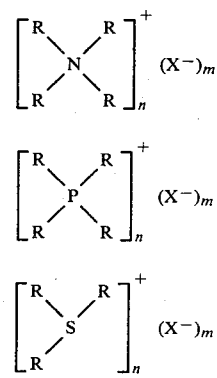

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate sulfate or phosphate radical, m is the valency of the X ion and n=m.

Other suitable catalysts include the sulfonic acids such as para-toluene sulfonic acid and the strong mineral acids such as phosphonic acid.

The amount of the above-noted polyepoxide and acid to be used in the reaction may vary over a wide range. In general, these reactants are used in approximately chemically equivalent amounts. As used herein and in the appended claims a chemical equivalent amount of the polyepoxide refers to that amount needed to furnish one epoxy group per carboxyl group. Excess amounts of either reactant can be used. Preferred amounts range from aobut 0.5 to 2 equivalents of epoxide per equivalent of carboxylic acid.

The amount of the catalyst employed may also vary over a considerable range. In general, the amount of the catalyst will vary from about 0.05% to about 3% by weight, and more preferably from 0.1% to 2% by weight of the reactants.

The reaction may be conducted in the presence or absence of solvents or diluents. In most cases, the reactants will be liquid and the reaction may be easily effected without the addition of solvents or diluents. However, in some cases whether either or both reactants are solids or viscous liquids it may be desirable to add diluents to assist in effecting the reaction. Examples of such materials include the inert liquids, such as ketones, xylene, toluene, cyclohexane and the like.

If solvents are employed in the reaction and the resulting product is to be used for coating purpose, the solvent may be retained in the reaction mixture. Otherwise, the solvent can be removed by any suitable method as by distillation and the like. If the product is not to be used for some time after its formation, it may also be desirable to remove the catalyst used in the preparation, such as by stripping and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about 0.020 eq./100 g. or below.

The preparation may be effected in any suitable manner. The preferred method merely comprises adding the polyepoxide, acid, catalyst, and solvent or diluent, if desired, in any order and then applying the necessary heat to bring about the reaction. The reaction mixture may then be distilled or stripped to remove any of the necessary components, such as solvents, catalyst, excess reactants and the like.

Fatty Acids and Rosin Acids

The instant low viscosity vinyl ester resins are simply prepared by esterifying greater than 90%, and preferably greater than 95% of the secondary pendant hydroxyl groups of the above vinyl esters with a fatty acid or rosin oil acid. Suitable acids include the non-drying oil acids such as coconut acids, cottonseed acids, rosin acids, tall oil and the like; the drying oil acids such as dehydrated castor oil acids, dimerized and trimerized fatty acids, linseed oil acids, oiticia acids, soy acids, tung acids. etc. The acid(s) found in the various naturally occurring oils is well-known and need not be delineated here. Suitable dimerized and trimerized fatty acids and their preparation are described in U.S. Pat. No. 3,706,684, among many other sources. Accordingly, the disclosure relevant to dimer and trimer fatty acids in U.S. Pat. No. 3,706,684 is herein incorporated by reference.

The instant low viscosity vinyl ester resins are simply prepared by reacting the previously prepared vinyl ester resin with one or more of the above-noted fatty acids or rosin acids. The amount of acid employed is sufficient to esterfy at least 90% of the pendant secondary hydroxyl groups of the vinyl ester, and preferably at least 95% of said hydroxy groups. In some instances, up to about a 10% excess of acid may be employed. This esterification reaction may be performed in the presence of an esterification catalyst and in the presence of a suitable solvent at a temperature of from about 100° C. to about 250° C. for a time sufficient to effect the necessary esterification; usually from about 30 minutes to about 5 hours, preferably from about 1 to about 3 hours.

These low viscosity vinyl esters may be used neat or blended with a compatible copolymerizable monomer. Examples of such monomers include, among others, aromatic compounds such as styrene, alpha-methylstyrene, dichlorostyrene, vinyl naphthalene, vinyl phenol and the like, unsaturated esters, such as acrylic and methacrylic esters, vinyl acetate, vinyl benzoate, vinyl chloroacetate, vinyl laurate, and the like, unsatuated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylontrile, diolefins, such as butadiene, isoprene, methylpentadiene, esters of polycarboxylic acids, such as diallyl phthalate, divinyl succinate, diallyl maleate, divinyl adipate, dichloroallyl tetrahydrophthalate, and the like, and mixtures thereof.

The low viscosity vinyl esters may be polymerized alone in combination with any of the above-noted unsaturated monomers to form valuable polymeric products. When used in combination with the above components, the amount of the other component may vary over a wide range, but it is generally preferred to have at least 15% by weight of the polyester present. In working with components, such as the aromatic unsaturated monomers, such as styrene, it is preferred to utilize from 1% to about 65% of the dissimilar monomer and from 99% to 35% of the low viscosity vinyl ester.

The polymerization of the above-noted vinyl esters or mixtures thereof with monomers may be accomplished by any suitable method. The preferred method comprises heating the modified vinyl esters or mixtures thereof, in the presence of a free radical yielding catalyst. Examples of such catalysts includes the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide. Tretalin hydroperoxide, phenylcyclohexane hydroperoxide, tertiary butylisopropylbenzene hydroperoxide, tertiary butyl peracetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'- azobisisobutyronitrile, dimethyl 2,2'-azobiisobutyrate, 2,2'-azobis(2,4-dimethylvaleronitrile, 2,2'-azobiisotulyamide, and the like. Particularly preferred catalysts include the diaroyl peroxide, tertiary alkyl hydroperoxides, alkyl peresters of percarboyxlic acids and particularly those of the above-noted groups which contain no more than 18 carbon atoms per molecular and have a decomposition temperature below 125° C.

Other materials may also be added to the mixtures before or during polymerization, including plasticizers, stabilizers, extenders, oils, resins, tars, asphalts and the like, as well as all types of coloring or pigments to give the material the desired color.

The above-noted components may be mixed in any order and then the combined mixture heated to the desired temperature. Temperatures employed in the polymerization will vary depending upon the reactants and catalyst selected. In general, polymerization temperatures may vary from about 20° C. to about 200° C. and more preferably from 20° C. to 125° C.

The low viscosity vinyl esters and their above-noted mixtures with other monomers may be utilzied in a wide variety of different applications. They may be utilized in the preparation of coatings and impregnating compositions, in the preparation of adhesives for metals, wood, cement and the like, and in the preparation of reinforced composite products, such as laminated products, filament windings and the like. In this latter application, the polyester compositions are applied to the fibrous products, such as glass fibers or sheets, the material formed into the desired object and heated to effect cure of the polyester composition.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

Epoxy Resin A is a glycidyl polyether of 2,2-bis(4-hydroxyphenyl)propane having a weight per epoxide (WPE) of about 180 and an average molecular weight of about 380.

Epoxy Resin B is a glycidyl polyether of hydrogenated 2,2-bis(4-hydroxyphenyl)propane having a WPE of about 234 and an average molecular weight of about 484.

PTSA is para-toluenesulfonic acid.
TMAC is tetramethyl ammonium chloride.
PA is a phosphoric acid ($H_3PO_4$).
Vinyl Ester A is a diacrylate ester of Epoxy Resin A and acrylic acid having a viscosity of about 8,000 to 10,000 poise.
Vinyl Ester B is a diacrylate ester of Epoxy Resin B having a viscosity of about 1,000 to 2,000 poise.

EXAMPLE I

This example illustrates the typical method for the preparation of the instant low viscosity vinyl ester resins.

| Formulation | Parts by weight |
|---|---|
| Vinyl Ester B | 2,000 |
| Coconut fatty acids | 1,231 |
| Hydroquinone | 1.9 |
| Methyl ether of hydroquinone | 1.9 |
| Phosphoric acid (85%) | 39.0 |
| Toluene | 195 |
| | 3,468.8 |

All of the above components were charged to a kettle equipped with stirrer, thermometer, condenser, water trap, nitrogen and air sparge. The reaction mixture was heated to 300° F. with nitrogen/air (2:1) sparge and held at 149° C. (300°F.) until no water was collected. A vacuum was applied at 177° C. (350°F.) to remove the toluene. The total reaction time was three hours. The resulting modified vinyl ester had reduced viscosity compared wiht the neat vinyl esters. The results of similar formulations using various degrees (%) of esterification, esterification catalysts and esterifying acids are tabulation in Table I.

| Epoxy Resin Diacrylate | Ester Viscosity - Poise | | | | | | | |
|---|---|---|---|---|---|---|---|---|
| | Vinyl Ester A Modified | | | | | Vinyl Ester B | | |
| Esterification - % | 30 | 40 | 50 | 70 | 80 | 95 | 95 | 95 |
| Esterification Catalyst | PTSA | TMAC | PTSA | PTSA | TMAC | PTSA | PTSA | $H_3PO_4$ |
| Esterifying Acid | | | | | | | | |
| Tall Oil Fatty Acids | Gel | — | Gel | 734 | — | 192 | 43 | — |
| Soybean Oil Fatty Acids | — | — | — | — | — | — | 61 | — |
| Linseed Oil Fatty Acids | — | — | — | 488 | — | — | — | — |
| Coconut Acids | — | 3510 | — | 2424 | 1680 | — | 39 | 56 |
| Dehydrated Castor Oil Fatty Acids | — | — | — | Gel | — | — | — | — |
| Caprylic Acid | — | — | — | — | — | — | — | 189 |
| Benzoic Acid | — | — | — | Gel | — | — | Gel | Gel |
| Oleic Acid | — | 2380 | — | — | — | — | — | Gel |

What is claimed is:

1. A vinyl ester resin composition exhibiting reduced viscosity prepared by first reacting an epoxy compound containing at least one vicinal epoxy group in the molecule with an ethylenically unsaturated carboxylic acid and then esterifying at least 90% of the pendant hydroxyl groups of said reaction product with a fatty or rosin acid.

2. The composition of claim 1 wherein the epoxy compound is a glycidyl polyether of a polyhydric phenol.

3. The composition of claim 2 wherein the polyhydric phenol is 2,2-bis(4-hydroxyphenyl)propane.

4. The composition of claim 2 wherein the polyhydric phenol is hydrogenated 2,2-bis(4-hydroxyphenyl)propane.

5. The composition of claim 1 wherein the carboxylic acid is a monocarboxylic acid selected from the group consisting of acrylic and methacrylic acid.

6. The composition of claim 1 wherein an esterification catalyst is employed.

7. The composition of claim 1 wherein the rosin acid is tall oil fatty acids.

8. The composition of claim 1 wherein the fatty acid is linseed oil fatty acids.

9. The composition of claim 1 wherein the fatty acid is soybean oil fatty acids.

10. The composition of clai 1 wherein at least 95% of the hydroxyl groups are esterified.

* * * * *